United States Patent [19]

Hartwell et al.

[11] Patent Number: 5,507,382
[45] Date of Patent: Apr. 16, 1996

[54] BELT STABILIZER FOR PINCH BELT CONVEYOR

[75] Inventors: S. A. Hartwell, Williamstown, Mass.; Greg M. Sterling; Peter MacFarland, both of Quakertown, Pa.

[73] Assignee: G. S. Blodgett Corporation, Burlington, Vt.

[21] Appl. No.: 339,737

[22] Filed: Nov. 14, 1994

[51] Int. Cl.⁶ .................................................. B65G 15/60
[52] U.S. Cl. ........................ 198/837; 198/835; 198/806
[58] Field of Search .......................... 193/37; 198/835, 198/837, 842, 806, 810.03, 785

[56] References Cited

U.S. PATENT DOCUMENTS

| | | |
|---|---|---|
| 722,252 | 3/1903 | Richards . |
| 3,308,929 | 10/1965 | Shriver . |
| 3,327,839 | 6/1967 | Sigety et al. ........................... 198/835 |
| 5,017,969 | 5/1991 | Mitomi et al. ...................... 198/835 X |
| 5,096,045 | 3/1992 | Feldl .................................. 198/835 X |
| 5,119,924 | 6/1992 | Kaminski ........................... 198/835 X |

FOREIGN PATENT DOCUMENTS

| | | | |
|---|---|---|---|
| 0254410 | 11/1986 | Japan ..................................... 198/806 |
| 2162144 | 1/1986 | United Kingdom ................... 198/806 |

*Primary Examiner*—James R. Bidwell
*Attorney, Agent, or Firm*—Lowe, Price, LeBlanc & Becker

[57] ABSTRACT

A method and apparatus are described for stabilizing a thin, relatively frictionless conveyor belt against lateral movement. The typical belt is made of fiberglass and Teflon-coated and is mounted on rollers, one of which is a drive roller. The drive roller is equipped with at least one ridge disposed circumferentially adjacent an end thereof and the belt forms a track which receives the ridge as the roller rotates. The track, in turn, has mutually spaced holes along its length. The holes are disposed at least so that two contact the roller during each revolution, and the diameter of the ridge is less than one-half of the diameter of the hole. This tracking device then will maintain the belt during operation against lateral movement relative to the rollers.

10 Claims, 2 Drawing Sheets

FIG. 2
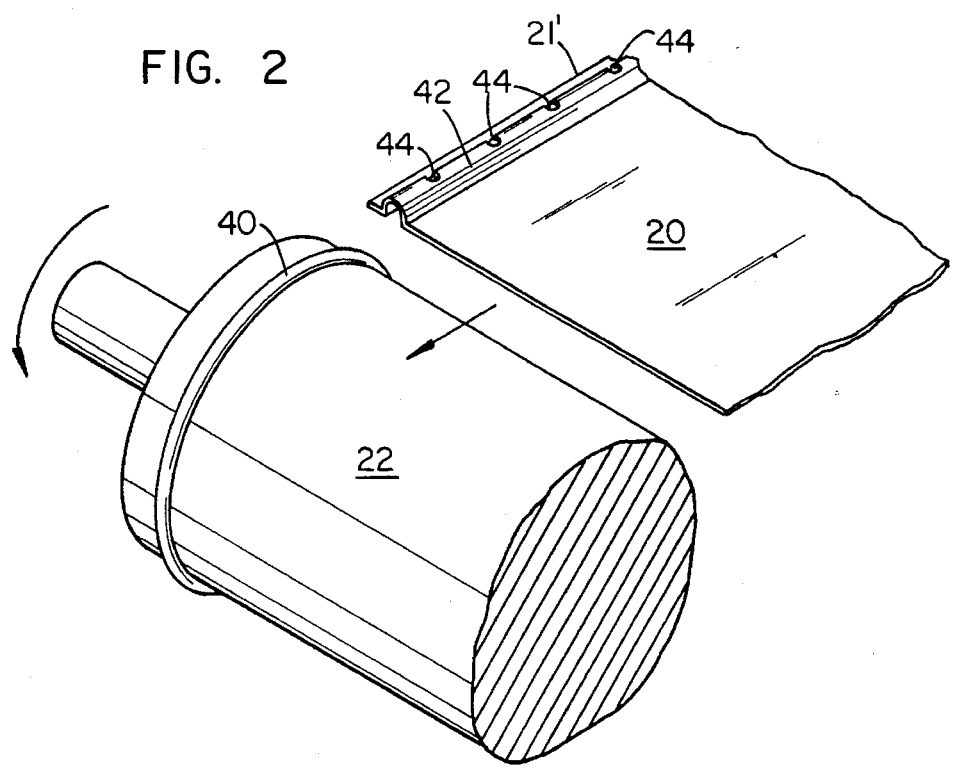
FIG. 3
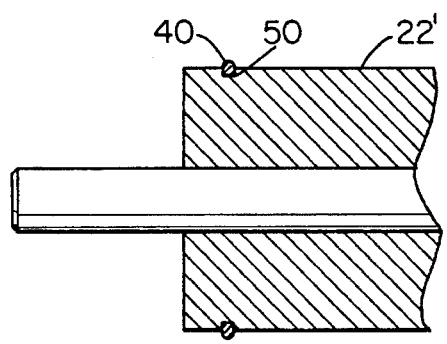
FIG. 4
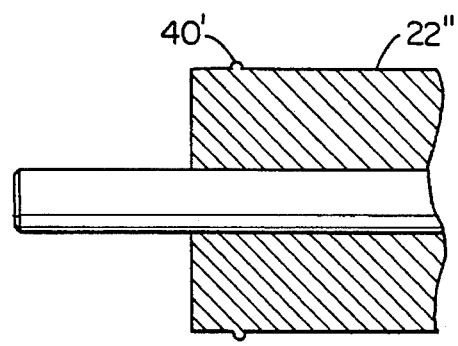
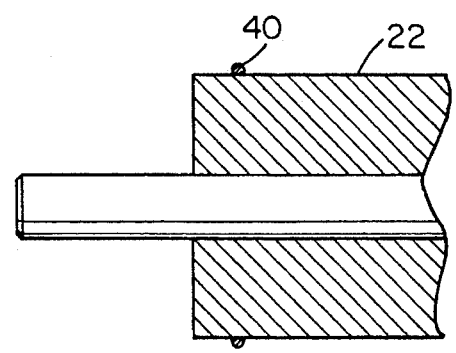
FIG. 5

BELT STABILIZER FOR PINCH BELT CONVEYOR

CROSS REFERENCE TO RELATED APPLICATION

This application is related to U.S. patent application Ser. No. 08/158,581, filed Nov. 29, 1993, and assigned to the assignee of this invention.

FIELD OF THE INVENTION

This invention relates to a method and apparatus for stabilizing conveyor belts against lateral movement. Specifically, in the case of stretchable belts which travel essentially horizontally and operate under elevated temperatures, the instant device is intended to maintain the belt during operation on an even track without lateral translation along the rollers which drive the same.

DESCRIPTION OF THE PRIOR ART

Consistent tracking for thin conveyor belts at low speeds is a difficult requirement in conveyor operation. Specifically, in the case of glass fiber belts such as those coated with Teflon, consistent tracking is a major problem. These belts may be less than 0.015 inches thick and at speeds of, for example, 3 to 60 inches per minute under conditions wherein the belt becomes heated, the belt tends to ride off of its drive rollers.

Efforts have been made for many years to stabilize conveyor belts against lateral movement. For example, in U.S. Pat. No. 3,308,929 a pair of ridges on the drive roll are provided and a corresponding groove is provided in the belt. The belt then clings to the roller and to the ridges during movement. Similarly, in U.S. Pat. No. 722,252, a ridge is provided on either end of the drive roller and a corresponding groove is provided on either edge of the belt. The ridge then rides in the belt groove to stabilize the belt.

Also, crowned rollers, helically grooved rollers, spring loaded roller support points, lead screw adjustments for roller ends, adjustable slots for roller bearing supports, sprocket drives, and edge pinch rollers are well-known examples. The side-to-side belt movement may be monitored by existing optical, mechanical or electronic means to determine the effectiveness of such a method so that manual or automatic adjustments may be made from time to time.

However, in using low surface friction belt material such as Teflon-coated glass fiber belts, conventional methods for uniform belt tracking have been found to be ineffective. In U.S. patent application Ser. No. 08/158,581, there is described a conveyor belt grilling apparatus for cooking a wide variety of foods including hamburgers wherein counter-rotating Teflon-coated glass fiber belts are used to convey the material to be cooked. The raw food is loaded in the bite between upper and lower conveyor belts and conveyed thereby between upper and lower heated platens. In the case of hamburger, a large quantity of grease will be a byproduct of the cooking process and, in the case also of hamburgers, it is most likely desirable to provide for cooking large quantities thereof as fast as possible. In such situations, the Teflon belt not only becomes greasy, but is heated by the upper and lower heated platens so that it expands and stretches. Side loading is not an acceptable means for tracking of such belts and other conventional means normally employed for tracking have been found to be unworkable. For example, clearly since such belts which be less than 0.015 inches thick, a sprocket drive cannot work. Such a drive would tear the belt.

Similarly, using an O-ring or similar ridge on the roller which causes the belt to define a raised track was also not effective.

Existing tracking methods require accurate relationships between the various components in the belt travel path; roller alignment, belt tension, belt squareness, roller displacement, bearing alignment, and support frame accuracy, are a few of the parameters to be controlled. After all components are correctly adjusted and aligned, a period of operation is required to determine if accurate belt tracking has been achieved. This can require up to several hours at slow speeds before any deviation is recognized. After adjustment to the system, an additional period of time will be required to determine the extent of the correction. Therefore, the absence of accurate tracking can require time-consuming adjustments on a continual basis. Should the belt tracking remain erratic or continue uncorrected or undetected, the conveying belt can track off the rollers and require shutdown and replacement.

There is a need then for a means to stabilize thin flexible belts such as the above-described Teflon belts used in an environment wherein the belt will stretch or tend to slip whereby at slow speeds the belt can be maintained on an accurate track.

SUMMARY OF THE INVENTION

It has been discovered that thin, flexible belts, such as Teflon-coated glass fiber belts, can be tracked in a heated environment by providing at least one O-ring on the drive roller for the conveyor belt adjacent one end. The belt described a corresponding track as it passes over the roller and conforms to the configuration of the O-ring. This track then is perforated by holes spaced at least no greater than the diameter of the drive roller apart and, preferably, closely spaced.

It has been found in this configuration such thin, flexible belts will track for an extended run without lateral movement. This invention then requires the perforation of a track along the belt which corresponds to an O-ring-type of ridge on an end of the drive roller. While a single O-ring-type ridge is adequate to stabilize the belt against lateral movement, obviously a plurality of such ridges could be provided spaced along the drive roller. It is not necessary to provide a similar structure on the follower rollers.

Accordingly, it is an object of this invention to provide an apparatus and method for tracking a conveyor belt and, in particular, a thin, flexible belt designed to operate at low speeds.

It is another object of this invention to provide a belt having a groove therein and an O-ring-type ridge mounted adjacent an end of the drive roller for said belt whereby the groove and ridge are mating and further perforating the groove with mutually spaced holes along the entire length thereof.

It is still a further object of this invention to provide a method and apparatus for use in a belt grill wherein the conveyor belts for conveying food to be cooked through a cooking section are Teflon-coated glass fiber belts which, in the heated environment of the grill stretch so that the device of this invention will maintain said belts during the cooking operation against lateral movement along the roller system.

These and other object will become readily apparent with reference to the drawings and following description wherein:

BRIEF DESCRIPTION OF THE DRAWINGS

FIG. 2 is a fragmentary perspective view illustrating the roller and belt stabilizer of this invention.

FIG. 3 is a fragmentary view in partial cross-section of a drive roller illustrating one embodiment of this invention.

FIG. 4 is a view similar to FIG. 3 illustrating another embodiment of this invention.

FIG. 5 is a view similar to FIG. 3 illustrating yet another embodiment of this invention.

DETAILED DESCRIPTION OF THE INVENTION

Figure 1:
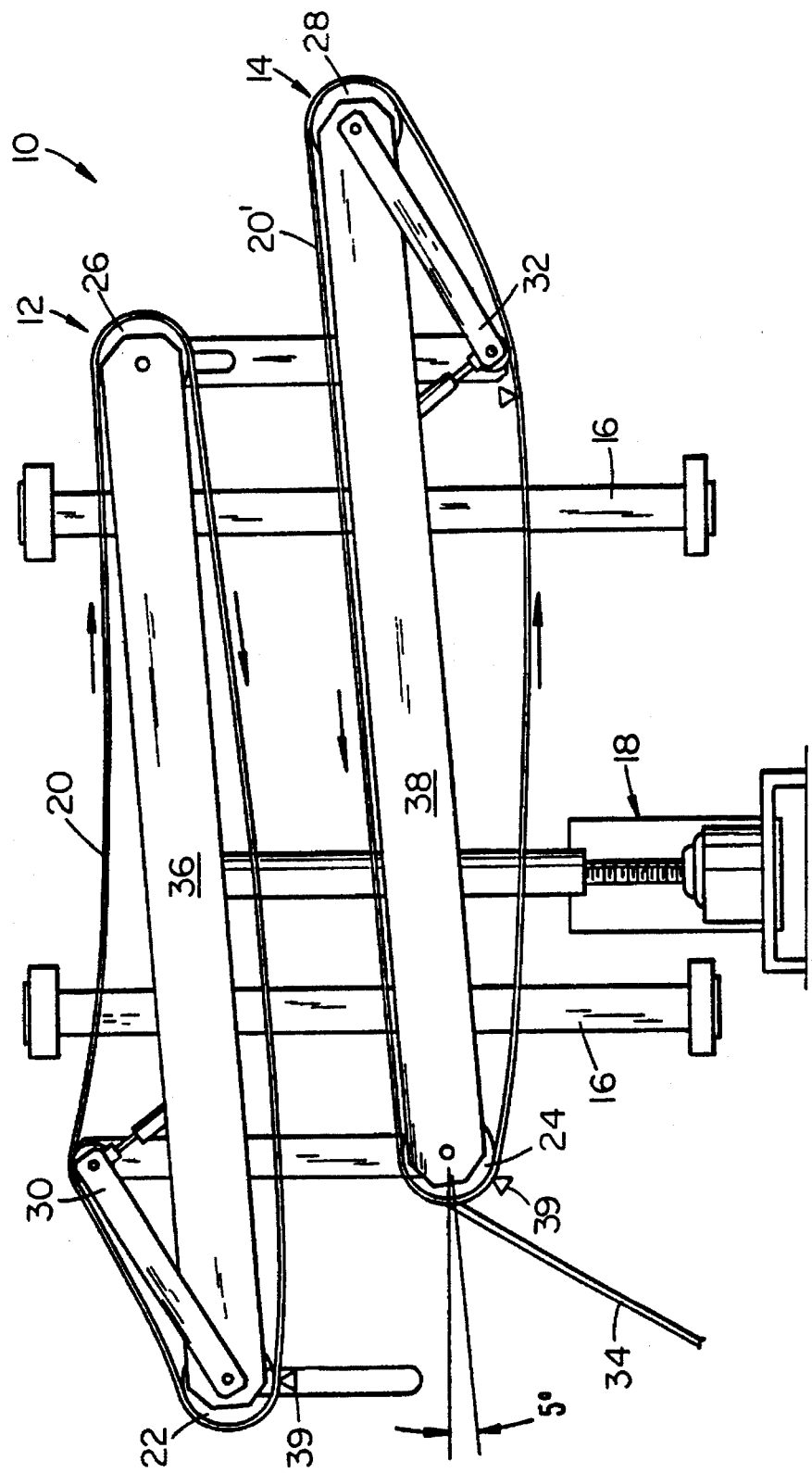
FIG. 1 is a side view of a belt grill utilizing the stabilizer of this invention wherein the counter-rotating belts are separated vertically.

With attention to FIG. 1, the belt grill 10 as described in copending U.S. patent application Ser. No. 08/158,581, filed Nov. 29, 1993, consists of upper and lower assemblies 12 and 14. Assembly 12 is slidingly mounted on vertical support bars 16 and a screw drive mechanism 18 is provided to raise the upper assembly 12 relative to the lower assembly 14 for belt removal, cleaning and the like.

Assemblies 12 and 14 mount Teflon-coated fiberglass belts 20 and 20' which extend in an endless fashion between drive rollers 22 and 24, and follower rollers 26 and 28. A tensioner means 30 and 32 is provided in each assembly 12 and 14 to normally maintain tension in the belts 20 and 20', or to relieve the tension so the belts can be removed for replacement.

As illustrated, during normal operation, belts 20 and 20' are counter-rotating so that when the upper belt assembly 12 is lowered to a point adjacent the lower assembly 14, the belts will be substantially overriding each other forming a bite therebetween. Food then can be inserted at the right hand side of the lower belt assembly 14 and will be carried between belts 20 and 20' towards the left, as shown in FIG. 1, and will exit on a ramp 34 to a collection point (not shown). Platens 36 and 38 are provided, respectively, in assemblies 12 and 14 and such platens are intended to be heated to cook the food passing between belts 20 and 20'.

In the case of hamburgers, grease in large quantities will be generated during the cooking process. Doctor blades 39 are provided adjacent the drive rollers at the end of the cooking sequence but, as will be obvious to those skilled in the art, the grease and heat in combination will make tracking of belts 20 and 20' on rollers 22, 24, 26 and 28 difficult.

With reference to FIGS. 2–5, the stabilizer of this invention involves the discovery that a drive roller, for example, 22 can be equipped with a ridge-like circumferential member 40 disposed adjacent an end thereof, and can be mounted on either end of the drive roller 22 or on both ends, if desired. This member can be an O-ring or similar device. The belt 20 then will be equipped with a matching track 42 having mutually spaced holes 44 disposed along the length thereof. As the belt 20 passes over the roller 22 then, track 42 will cling to the roller 22 and member 40 thereon. It has been discovered then that this combination will provide sufficient stability to insure accurate tracking of belt 20 relative to its rollers, for example, 22 and 26.

With reference to the spacing of holes 44, preferably the holes 44 are located ½ to 1 inch from the edge 21 of belt 20 and are spaced about ¾ inch apart wherein the roller 22 is at least about 1 inch in diameter. These are the dimensions of the preferred embodiment. It is necessary, however, that there be at least two holes 44 contacting the drive roller 22 as it rotates one revolution. Therefore, if the drive roller is, for example, three inches in diameter, a belt hole spacing of three inches has been found to be successful. Belt hole perforations are preferably ¼ inch in diameter but may vary depending upon the dimensions of the drive roller and the ridge or ring. While round holes 44 are preferred, the holes may be any geometric design. The diameter of the ridge or ring 40 should be less than 50% of the perforated belt hole diameter so that a suitable track 42 will form in the belt 20.

In the preferred embodiment, the rollers 20 are rubber surfaced on a suitable core of metal, wood, plastic, or ceramic, for example. The ridge or ring is of rubber material. The preferred ring is round in cross-section and has about a 3/32 inch diameter. An O-ring is typically the preferred structure although the ring may be molded, machined or adhesively bonded to the drive roller. See FIGS. 3, 4 and 5 for alternate structures.

In the embodiment of FIG. 3, the roller 22' has a groove 50 therein which receives the O-ring or similar device 40. In the embodiment of FIG. 4, a ridge 40' is formed on the surface of the roller 22" as an integral part thereof. Finally, in the embodiment of FIG. 5, the roller 22 has an O-ring 40 adhesively secured to the surface thereof.

The ring 40 formed by whatever means according to this invention then forms the track 42 in belt 20 as shown in FIG. 2 as the belt itself clings to the rotating drive roller 22. Typically the belt is of fiberglass material impregnated with a suitable polymeric substance such as Teflon (polytetrafluoroethylene). The belt edges 21 may be reinforced by lamination or other suitable techniques and typically the holes 44 are coated with the Teflon material to seal the edges thereof and prevent wicking of materials being transported on the belt.

As indicated above, thin low surface friction belt material which does not support side loads for tracking, combined with slow belt speeds will defeat conventional means for tracking conveyor belts. Conventional means include a variety of different observation techniques and monitoring apparatus so that a precise belt orientation can be provided. In the case of thin belts, for example, having a thickness of less than 0.015 inches of Teflon-coated fiberglass and at low speeds of about 30 to 60 inches per minute, such monitoring techniques only indicate that the belt is not tracking and the necessary adjustments do not necessarily hold as the belt becomes heated and expands. As also previously indicated, such conventional means, such as sprocket drives, edge pinch rollers, and the like, do not work with this thin, frictionless belt material. Furthermore, a tight belt tensioning or tensioning force tolerance limit will not solve the problem either because the belt will stretch. It has been discovered, however, that only a lightly tensioned conveyor belt will suitably track using the device of this invention.

In summary then, it has been discovered that relatively thin, frictionless belts can be stabilized against lateral movement relative to the rollers even under conditions wherein the belt is heated and grease is present using the stabilizer of this invention. Specifically, a rubber circumferential ridge is disposed on the drive roller adjacent one edge which ridge is intended to raise a corresponding track in the rotating belt driven by the drive roller and which track has regularly spaced holes therein along the length, which holes are at least spaced so that two will contact the roller during each revolution. Furthermore, the ridge has a diameter which is less than one-half of the hole diameter in the belts. This then forms a tightly clinging track which clings to the ridge as the remaining surface clings to the roller surface and thereby stabilizes the belt against lateral movement.

It will be readily seen by one of ordinary skill in the art that the present invention fulfills all of the objects set forth above. After reading the foregoing specification, one of ordinary skill will be able to effect various changes, substitutions of equivalents and various other aspects of the invention as broadly disclosed herein. It is therefore intended that the protection granted hereon be limited only by the definition contained in the appended claims and equivalents thereof.

We claim:

1. In a belt conveyor having at least one drive roller and follower roller and a thin endless belt thereon having a substantially frictionless surface the improvement comprising:

a circumferential ridge disposed adjacent an end of said drive roller extending above the outer surface thereof engaging the inner surface of said belt;

said belt defining an endless raised track receiving said ridge as said belt passes over said roller and a plurality of holes therethrough mutually spaced along said track so that at least an adjacent pair of said holes pass over said roller with each revolution thereof and each hole having a maximum dimension more than twice the diameter of said ridge.

2. The conveyor of claim 1, wherein the outer surface of said roller and said ridge are of rubber material.

3. The conveyor of claim 1, wherein said belt is fiberglass coated with Teflon.

4. The convertor of claim 3, wherein said track is formed in said belt as said belt passes over said drive roller.

5. The conveyor of claim 3, wherein said holes are circular and have a diameter of about ¼ inch.

6. The conveyor of claim 2, wherein said ridge is formed by an O-ring.

7. The conveyor of claim 6, wherein said roller has a circumferential groove and said O-ring is received therein 8. The conveyor of claim 6, wherein said O-ring is adhesively mounted on the exterior surface of said roller.

9. The conveyor of claim 6, wherein said track is disposed about ½ to 1 inch from an edge of said belt and said holes are about ¾ inch apart.

10. Method for stabilizing a belt conveyor having a drive roller, follower and an endless belt so that said belt does not displace laterally relative to the roller driving it comprising:

providing a circumferential ridge around the outer surface of said drive roller adjacent an end thereof;

providing a corresponding raised track extending endlessly along said belt adjacent an edge thereof said track defining mutually spaced holes therein; and registering said ridge in said track so that as said drive roller rotates said ridge rides in said track, said holes being spaced so that at least two adjacent holes pass over said roller during one revolution thereof.

* * * * *